UNITED STATES PATENT OFFICE.

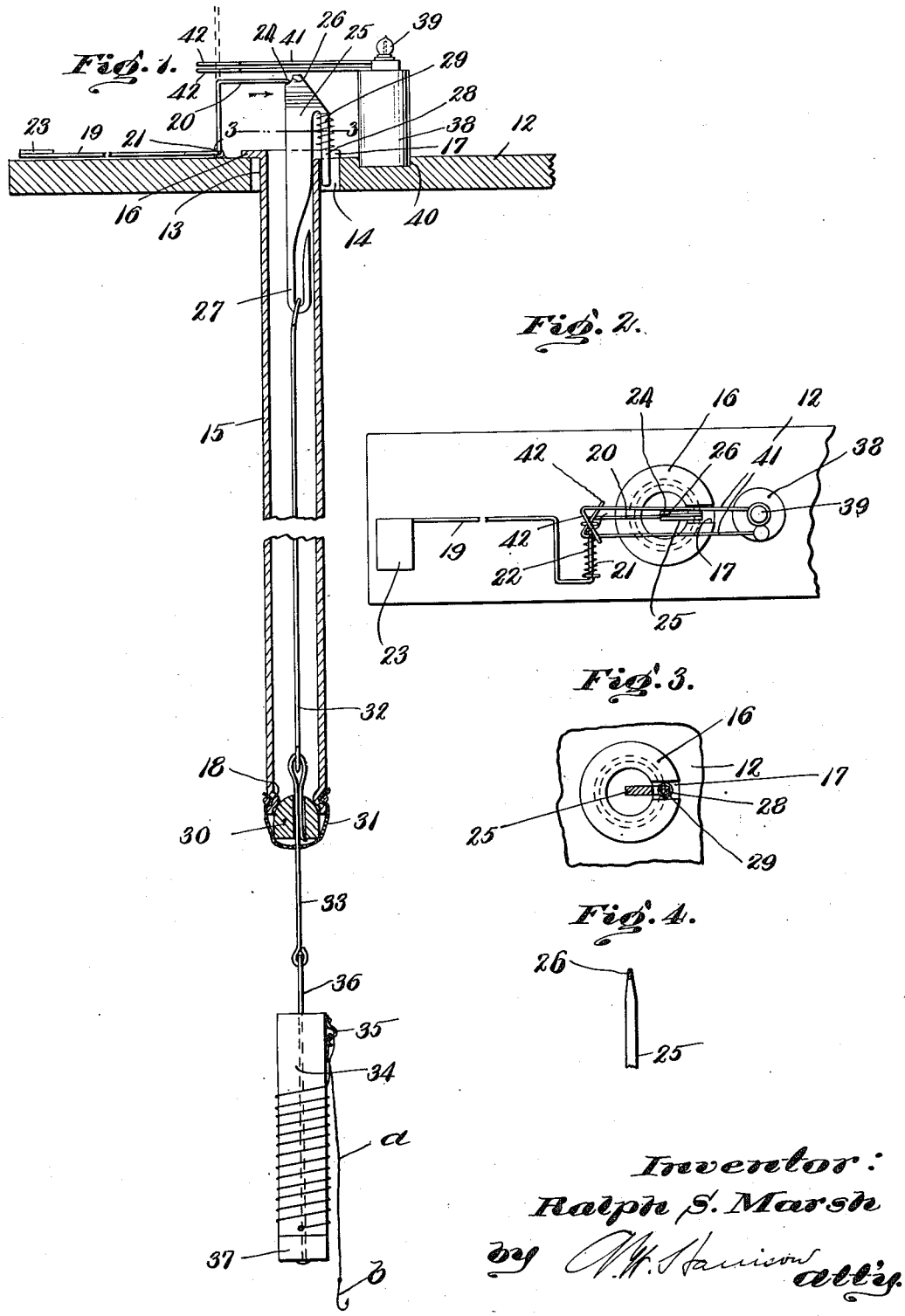

RALPH S. MARSH, OF CONWAY, NEW HAMPSHIRE.

FISHING APPARATUS.

1,173,827.  Specification of Letters Patent.  Patented Feb. 29, 1916.

Application filed October 30, 1915. Serial No. 58,745.

*To all whom it may concern:*

Be it known that I, RALPH S. MARSH, of Conway, in the county of Carroll and State of New Hampshire, have invented certain new and useful Improvements in Fishing Apparatus, of which the following is a specification.

This invention relates to fishing apparatus of the kind some times called fish traps, employing a line with baited hook and so supported and connected that in case a fish bites, a signal is shown to the watcher.

Devices or apparatus of this kind are used to a great extent for fishing in the winter time, the fisherman cutting holes in the ice for quite a number of the traps or devices and then going from one to another when the signal indicates a bite, and then pulling in the fish up through the holes in the ice. Although my apparatus, as will be hereinafter explained, may be usefully employed in other seasons of the year, the main object of my invention is to provide an apparatus or device of this character which will prevent any liability of the freezing up of the hole or the fish line.

To this end I provide a tube or its equivalent which is extended downwardly through a hole in the ice, means being provided for keeping water out of the tube or its equivalent, all of the fish-line proper being below the freezing level.

With most of the devices of this nature heretofore used there is a liability of the water freezing so that chopping is required to free the line. Without great care the line is liable to be severed by the chopping implement.

My improvements, as will be readily understood hereinafter, thoroughly protect the line from injury under any circumstances.

My invention consists in the improvements which I shall now proceed to describe and claim.

Of the accompanying drawings: Figure 1 is a partial elevation and partial vertical section representing my invention in one of its embodiments. Fig. 2 is a plan view. Fig. 3 represents a detail section on line 3—3 of Fig. 1, looking down. Fig. 4 is a detail elevation looking in the direction of the arrow at the upper end of the trigger 25 shown in Fig. 1.

Similar reference characters indicate similar parts in all of the views.

A support for the apparatus may comprise a board 12, of any suitable size or dimensions, said support having a hole 13, one side of which is shown as cut away or enlarged to form a notch 14.

The protector for preventing ice from interfering with the operation of the apparatus comprises, in the embodiment of the invention illustrated, a tube 15 which may be of any suitable thickness or diameter or length, according to the preference of the user, or the climatic conditions under which the apparatus is to be used. The tube has a flange 16 at its upper end so that when said tube is dropped through the hole 13 in the board, and through the hole in the ice which supports the board 12, said tube will be prevented from dropping entirely through. The flange 16 has a notch 17 (Fig. 3), to register with the notch 14 when the parts are assembled for use, for a purpose presently explained. The lower end of the tube has an annular depression to form an external groove 18 with a corresponding internal rib.

A lever which may be made of a piece of bent wire with a long arm 19 and a shorter angular arm 20, is pivotally supported at 21, a spring 22 (Fig. 2) being so connected as to tend to swing the long arm 19 of the lever to a substantially upright position, the outer end of the arm 19 having a visible signal 23 which may comprise a flag of any suitable size. Such flag is only shown conventionally in the drawings.

The tip 24 of the arm 20 of the lever, when the device is set for use, bears against the trigger 25 as indicated in Fig. 1. I do not limit myself to any specific material or formation of this trigger, but in the embodiment of the invention illustrated it comprises a plate 25, the upper end or tip of which is laterally tapered, leaving but a narrow or sharp upper edge as indicated in Fig. 4, one corner being formed or provided with a notch 26 against which the tip 24 of the lever bears. The lower end of the trigger has a hook 27, and projecting downwardly from a shoulder of the upper portion of the trigger is a finger 28, said finger being adapted to move slightly vertically in the notches 17, 14. A spring 29 coiled around the finger 28 normally holds the trigger and the parts connected thereto in the position indicated in Fig. 1, but so that said trigger can be pulled downwardly slightly, when a fish bites, as hereinafter explained, to release the tip 24 of the lever and permit the spring 21 to swing the arm 19 upwardly so that the observer will know that the apparatus or trap has been sprung.

Suitable means are provided for preventing water from getting into the tube 15, such means being here illustrated as a wood plug 30 having a hemispherical upper surface bearing against the interior rib at the lower end of the tube, a rubber cap or nipple 31 suitably secured to the tube, holding said plug in position, but while still permitting the plug to rock or tilt.

I will state here that if the rubber cap or nipple is made of sufficient strength to prevent the water pressure from forcing it up into the tube and rupturing such cap, the plug 30 might be omitted. Said plug, however, renders it less liable that the apparatus can be put out of commission by the upward pressure of water seeking to enter the tube.

A link 32 has its upper end engaged with the hook 27 of the trigger, and at its lower end is loosely connected with the upper end of a relatively short link 33, which latter extends down through a central aperture in the plug 30, and through the apex of the flexible cap or nipple 31.

It is to be understood, of course, that the material of the flexible cap or nipple is such that it will fit the link 33 tightly enough to prevent the leakage of water.

The fish-line a is provided with a loop not far from the fish hook b, said line being mounted loosely upon a support or reel 34 which may comprise a strip of wood, one end of the line being secured to said strip. The loop of the line is engaged with a catch or detent 35 carried by the line support 34, said catch or detent being designed to hold the loop until a slight pull is exerted upon it, the eye then slipping out of the catch. Preferably the line support or reel is mounted rotatively upon a stem 36 which is loosely connected with the lower end of the link 33. If the line support or reel be of such material possessing a specific gravity that would render it too buoyant, its lower end 37 may be weighted. It is designed, of course, that the spring 29 shall just about counterbalance the weight of the parts depending from the hook 27 of the trigger when the tube and the other parts are immersed for use, so that a slight pull resulting from the fish taking bait on the hook b will act upon the detent 35 before the loop of the line is freed therefrom, and either pull the link 33 directly down, or rock it so that it will act as a lever, owing to the freedom of the plug 30 to rock or tilt slightly, and transmit sufficient pull through link 32 upon the trigger to cause the notch 26 to release the tip 24 of the signal lever. This is due to the downward movement of the trigger 25, the upper edge of which is so narrow that the tip 24 can not catch on the top of it but will ride down over one side of it. As stated, however, I do not limit myself to this specific form of trigger.

To enable the apparatus to be used also for night fishing, I may employ a suitable dry battery 38 having a lamp 39 and removably mounted in proper location on the board or support 12, as by providing said board with a socket 40 for the base of the battery.

It is not necessary to an understanding of the present invention to illustrate either the structure of the battery or the insulation between the terminals thereof. It is sufficient to explain that two terminals 41 may be employed, so insulated and connected that anything that will short-circuit those two terminals will result in the lamp 39 being energized. In the present embodiment of the invention the two terminals 41 comprise two wires having their outer ends inclined rearwardly and crossing each other, as best shown in Fig. 2. Since these two terminals are out of contact with each other, and since their crossing ends are in the path of the lever arm 19 when the latter swings to upright position, as indicated by dotted lines in Fig. 1, the said arm 19 serves as a switch to connect the two terminals 41 and cause the lamp to show a light. It will, therefore, be understood that when the apparatus or device springs, resulting from a bite, either a night or day signal, or both, can be seen by the observer or fisherman who will then go to the particular apparatus designated and after shifting the lamp to one side or otherwise out of the way (if the lamp is employed) lifting the entire trap or apparatus until the line can be reached and handled to draw in the fish.

The object of the line support or reel 34 is not only to enable the fish to have considerable play before he is pulled in, but also to render it certain that the fish-line itself will be kept entirely below the level of the ice formation while waiting for a bite. Before the fish can run with the line, the jerking of the loop of the line out of the catch 35, results in the exhibition of a signal.

I believe that I am the first to provide any fishing apparatus having means whereby the fish-line itself may be kept entirely below the level of the ice formation while waiting for a bite. This prevents any formation of ice from interfering with the freedom of the line to pay out or unwind. With devices or apparatus which retain more or less of the fish-line above the ice or in such location that the water around the line may become frozen, then if a fish takes the bait, it is almost certain that the bait will be stripped off the hook without the fish being caught.

It will be readily understood, of course that if the support 12 is of wood, and of sufficient size to act as a float, or is otherwise so constructed to serve as a float, the apparatus may be employed for fishing in seasons other than ice-forming weather. In such case the parts below the float will be so constructed as to serve as ballast to keep the float from overturning I do not limit myself to making the member 12 of wood, since it may be constructed of any material or in any such form as to serve the purposes intended for it as hereinbefore described.

Having now described my invention in one of its embodiments, although I have not attempted to illustrate or explain all possible modifications thereof, what I claim is:

1. A fishing apparatus comprising a support, a signal connected with the support, a fish line adapted to effect the operations of the signal when a pull is exerted upon the line by a fish, and means extending below the support to prevent the formation of ice from interfering with the signal operating action of the line.

2. A fishing apparatus comprising a support, a signal connected with the support, a water-excluding member extending below the support to a distance exceeding the ordinary thickness of ice formation; a fish line below said water-excluding member, and means protected by said member for effecting the operation of the signal when a pull is exerted upon the line by a fish.

3. A fishing apparatus comprising a support, a tube extending below the support and vertically movable relatively thereto, a signal, a trigger therefor, a fish line below the tube, connections between the trigger and line extending through the tube and adapted to control the operation of the signal, and means for excluding water from the tube.

4. An apparatus for fishing through holes in ice, comprising a tube to be inserted in an ice-hole, a support for said tube, means for excluding water from the tube, and a line connected with said tube.

5. A fishing apparatus comprising a support, a signal connected therewith, a trigger for controlling the signal, a fish line, connections between said line and trigger, and means for preventing access of water to the upper part of the line.

6. A fishing apparatus comprising a support, a tube depending therefrom, a trigger mounted to move relatively to the tube, a signal, a spring for holding the trigger normally in position to prevent operation of the signal, line connections extending from the trigger through and below the tube, and means for excluding water from the interior of the tube.

7. A fishing apparatus comprising a support, a tube depending therefrom, a trigger mounted to move relatively to the tube, a signal, a spring for holding the trigger normally in position to prevent operation of the signal, line connections extending from the trigger through and below the tube, and means for excluding water from the interior of the tube, said signal including a lever having a tip bearing against the trigger.

8. A fishing apparatus comprising a support, a tube depending therefrom, a trigger mounted to move relatively to the tube, a signal, a spring for holding the trigger normally in position to prevent operation of the signal, line connections extending from the trigger through and below the tube, and means for excluding water from the interior of the tube, said water-excluding means including a plug mounted to rock in the lower end of the tube, the line connections extending through said plug.

9. A fishing apparatus comprising a support, a tube depending therefrom, a trigger mounted to move relatively to the tube, a signal, a spring for holding the trigger normally in position to prevent operation of the signal, line connections extending from the trigger through and below the tube, and means for excluding water from the interior of the tube, said water-excluding means including a water-proof flexible closure at the lower end of the tube, the line connections extending through said closure.

10. A fishing apparatus comprising a support, a tube depending therefrom, a trigger mounted to move relatively to the tube, a signal, a spring for holding the trigger normally in position to prevent operation of the signal, line connections extending from the trigger through and below the tube, and means for excluding water from the interior of the tube, said water-excluding means comprising a plug mounted to rock in the lower end of the tube and an elastic confiner for the plug, the line connections extending through the plug and confiner.

11. A fishing apparatus comprising a support, a tube depending therefrom, a trigger mounted to move relatively to the tube, a signal, a spring for holding the trigger normally in position to prevent operation of the signal, line connections extending from the trigger through and below the tube, and means for excluding water from the interior of the tube, said line connections comprising two connected links one of which is entirely within the tube and the other extends below the lower end of the tube.

12. A fishing apparatus comprising a support, a tube depending therefrom, a trigger mounted to move relatively to the tube, a signal, a spring for holding the trigger normally in position to prevent operation of the signal, line connections extending from the trigger through and below the tube, and means for excluding water from the interior of the tube, said line connections including a member having a catch for temporarily holding a loop of line.

13. A fishing apparatus comprising a support, a tube depending therefrom, a trigger mounted to move relatively to the tube, a signal, a spring for holding the trigger normally in position to prevent operation of the signal, line connections extending from the trigger through and below the tube, and means for excluding water from the interior of the tube, said line connections including a rotatably supported member for the fish line, said member having a catch for temporarily holding a loop of the line.

14. A fishing apparatus comprising an electric lamp, a support therefor, a pivoted member adapted to serve as a signal and to also close a circuit through the lamp, a trigger for said pivoted member, line connections with said trigger, and means for preventing access of water to said connections.

15. A fishing apparatus comprising a board having a hole and adapted to float in water or to bridge an opening cut in ice, a tube removably mounted in said hole, a signal, a trigger for said signal, line connections from the trigger and extending through the tube, and means for excluding water from the tube.

16. A device for fishing through a hole in ice, having means whereby the fish line may be kept entirely below the level of the ice formation while waiting for a bite, to prevent the formation of ice from interfering with the freedom of the line to pay out or unwind.

17. A device for fishing through a hole in ice, comprising a support to rest on the ice, a line support or reel, and connections between the two whereby the line support or reel may be kept submerged below the level of the ice formation, to prevent such ice formation from interfering with the line paying out or unwinding.

In testimony whereof I have affixed my signature, in presence of two witnesses.

RALPH S. MARSH.

Witnesses:
RICHARD F. KENDALL,
A. W. HARRISON.